(12) United States Patent
Honya

(10) Patent No.: US 11,970,174 B2
(45) Date of Patent: Apr. 30, 2024

(54) TRAVEL ROUTE PREDICTION DEVICE

(71) Applicant: DENSO CORPORATION, Kariya (JP)

(72) Inventor: Hideyuki Honya, Kariya (JP)

(73) Assignee: DENSO CORPORATION, Kariya (JP)

( * ) Notice: Subject to any disclaimer, the term of this patent is extended or adjusted under 35 U.S.C. 154(b) by 473 days.

(21) Appl. No.: 17/229,480

(22) Filed: Apr. 13, 2021

(65) Prior Publication Data

US 2021/0229682 A1 Jul. 29, 2021

Related U.S. Application Data

(63) Continuation of application No. PCT/JP2020/002561, filed on Jan. 24, 2020.

(30) Foreign Application Priority Data

Jan. 25, 2019 (JP) .................................. 2019-011447

(51) Int. Cl.
*B60W 50/00* (2006.01)
*B60W 50/04* (2006.01)
*H04W 4/46* (2018.01)

(52) U.S. Cl.
CPC ...... *B60W 50/0097* (2013.01); *B60W 50/045* (2013.01); *H04W 4/46* (2018.02); *B60W 2050/046* (2013.01)

(58) Field of Classification Search
CPC ..... B60W 2050/046; B60W 2050/143; B60W 2050/146; B60W 30/09; B60W 30/095; B60W 30/0953; B60W 30/0956; B60W 50/0097; B60W 50/045; B60W 50/14; G01C 21/3492; G01S 19/393; G01S 19/396; G01S 19/51; G01S 2205/01; G08G 1/163; H04W 4/029; H04W 4/46
See application file for complete search history.

(56) References Cited

U.S. PATENT DOCUMENTS

| | | | |
|---|---|---|---|
| 9,734,716 B2* | 8/2017 | Ando | G08G 1/163 |
| 9,897,455 B2* | 2/2018 | Horihata | G01C 21/34 |
| 2003/0018428 A1* | 1/2003 | Knockeart | G08G 1/096872 342/357.31 |
| 2007/0124063 A1 | 5/2007 | Kindo | |
| 2008/0162041 A1* | 7/2008 | Nakamura | G09B 29/007 701/533 |
| 2011/0172913 A1* | 7/2011 | Nakamura | G01C 21/3811 701/532 |
| 2011/0238294 A1* | 9/2011 | Shikimachi | G01C 21/3837 701/533 |

(Continued)

FOREIGN PATENT DOCUMENTS

| | | |
|---|---|---|
| JP | 2000275051 A | 10/2000 |
| JP | 2005321860 A | 11/2005 |
| JP | 2007179373 A | 7/2007 |

(Continued)

*Primary Examiner* — Tyler J Lee
(74) *Attorney, Agent, or Firm* — Harness, Dickey & Pierce, P.L.C.

(57) ABSTRACT

A travel route prediction device includes a receiver to receive travel loci of a plurality of peripheral vehicles around a vehicle and positioning accuracy of each of the travel loci by vehicle-to-vehicle communication. A travel route on which the vehicle will travel in future is predicted by using the travel loci and the positioning accuracy received by the receiver.

6 Claims, 5 Drawing Sheets

(56) References Cited

U.S. PATENT DOCUMENTS

2016/0086490 A1* 3/2016 Ando .................. B60W 30/08
701/301
2016/0091324 A1 3/2016 Horihata et al.

FOREIGN PATENT DOCUMENTS

| JP | 2008170278 A | 7/2008 |
|----|--------------|--------|
| JP | 2010170239 A | 8/2010 |
| JP | 2012063313 A | 3/2012 |
| JP | 2014235510 A | 12/2014 |
| JP | 2016133605 A | 7/2016 |
| JP | 2017224026 A | 12/2017 |

* cited by examiner

○ : TRAVEL LOCUS INFORMATION
---- : TRAVEL ROUTE CALCULATION RESULT

| POINT | POSITIONING ACCURACY | POINTS | POSITIONING ACCURACY |
|---|---|---|---|
| A1 | GOOD | B1 | GOOD |
| A2 | GOOD | B2 | GOOD |
| A3 | BAD | B3 | BAD |
| A4 | GOOD | | |

TRAVEL ROUTE PREDICTION DEVICE

CROSS REFERENCE TO RELATED APPLICATIONS

The present application is a continuation application of International Patent Application No. PCT/JP2020/002561 filed on Jan. 24, 2020, which designated the U.S. and claims the benefit of priority from Japanese Patent Application No. 2019-011447 filed on Jan. 25, 2019. The entire disclosures of all of the above applications are incorporated herein by reference.

TECHNICAL FIELD

The present disclosure relates to a technique for predicting a travel route by using vehicle-to-vehicle communication.

BACKGROUND

A collision accident prevention system registers the time-series vehicle position information received from peripheral vehicles around a host vehicle, estimates the road alignment (i.e., road shape) in front of the host vehicle from a travel locus, which is the registered time-series vehicle position information, and uses the estimated road alignment.

SUMMARY

According to an example of the present disclosure, a travel route prediction device is provided to include a receiver configured to receive travel loci of a plurality of peripheral vehicles around a vehicle and positioning accuracy of each of the travel loci by vehicle-to-vehicle communication. A travel route on which the vehicle will travel in future is predicted by using the travel loci and the positioning accuracy received by the receiver.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, exemplary embodiments for implementing the present disclosure will be described with reference to the drawings.

<1. Configuration>

Figure 1:
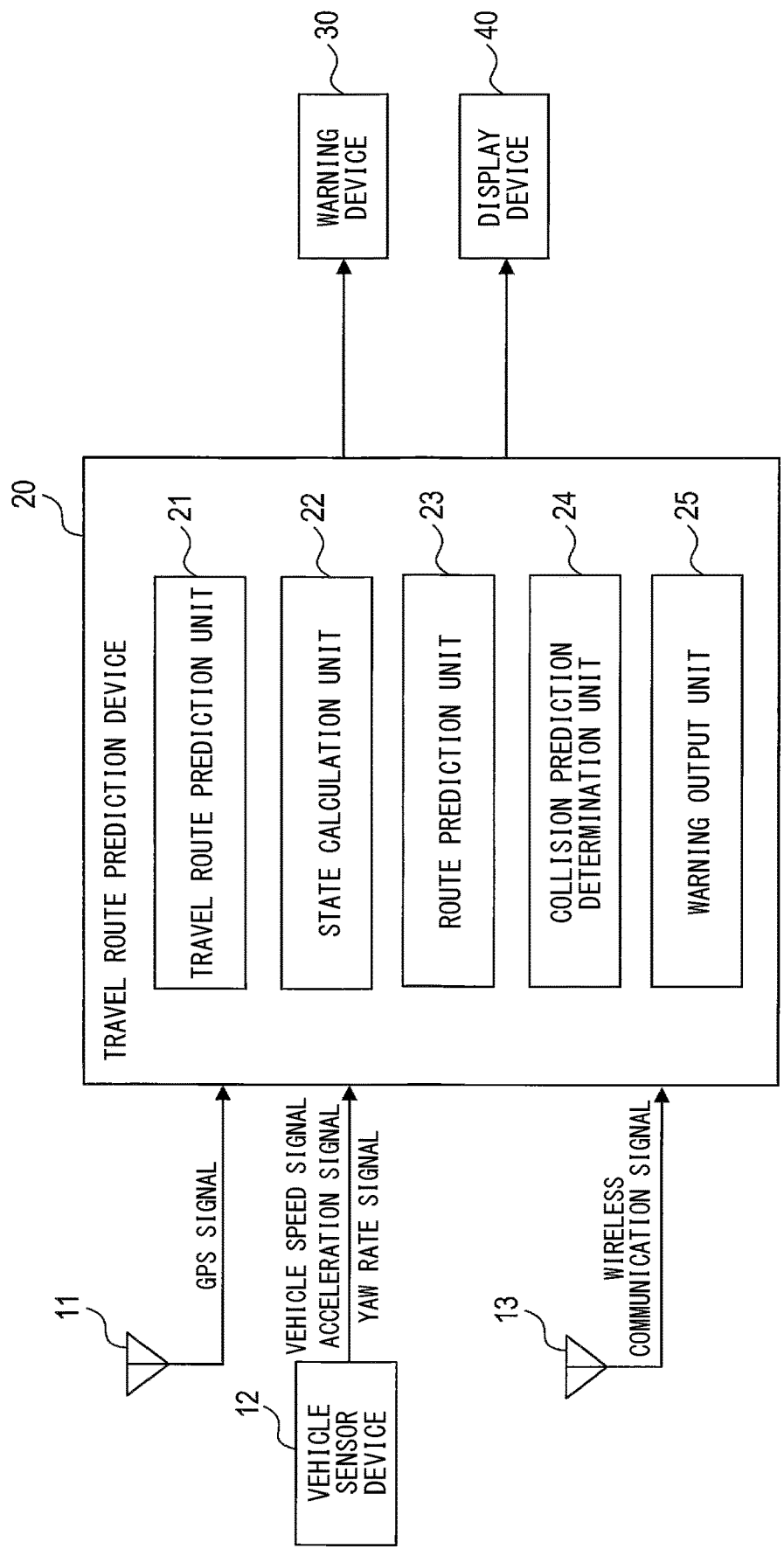
FIG. 1 is a block diagram showing a configuration of a travel route prediction device.

First, the configuration of a travel route prediction device 20 according to the present embodiment will be described with reference to FIG. 1. The travel route prediction device 20 is an in-vehicle device mainly including a controller or controller circuit. As a just example of the present embodiment, such a controller is provided as a microcomputer (i.e., microcontroller) having a CPU, ROM, RAM, semiconductor memory, and I/O. The travel route prediction device 20 is mounted on a vehicle 60, which may also be referred to as a host vehicle 60.

Further, in the example of the present embodiment, the travel route prediction device 20 or controller causes the CPU to execute a program stored in a semiconductor memory or the like to implement the functions of a state calculation unit 21, a peripheral state calculation unit 22, a route prediction unit 23 (which may also be referred to as a prediction unit 23), a collision prediction determination unit 24, and a warning output unit 25. Details of each function will be described later.

Further, the travel route prediction device 20 is connected to a GPS receiver 11, a vehicle sensor device 12, a wireless communication device 13, a warning device 30, and a display device 40.

The GPS receiver 11 receives GPS signals from GPS satellites and outputs the received GPS signals to the travel route prediction device 20. The GPS signals include (i) position information including the latitude, longitude and altitude of the position where the vehicle 60 exists, and (ii) positioning accuracy information indicating the positioning accuracy of the position.

The vehicle sensor device 12 includes a vehicle speed sensor that detects the vehicle speed of the vehicle 60, an acceleration sensor that detects the acceleration of the vehicle 60, and a yaw rate sensor that detects the yaw rate of the vehicle 60. The vehicle sensor device 12 outputs the detected vehicle speed signal, acceleration signal, and yaw rate signal to the travel route prediction device 20. Hereinafter, the vehicle speed signal, the acceleration signal, and the yaw rate signal are collectively referred to as sensor information.

The wireless communication device 13 performs wirelessly vehicle-to-vehicle communication (i.e., inter-vehicle communication) with a plurality of peripheral vehicles existing around the vehicle 60, and receives vehicle information of the peripheral vehicles from the plurality of peripheral vehicles. The wireless communication device 13 may also be referred to as a wireless transceiver 13 or a wireless receiver and transmitter 13. The vehicle information of the peripheral vehicle includes sensor information detected by a vehicle sensor device mounted on the peripheral vehicle, travel locus information, and positioning accuracy information. The travel locus information is a time series of position information, and includes a predetermined number of continuously received position information. The positioning accuracy information includes the positioning accuracy of each of a predetermined number of position information.

Further, the wireless communication device 13 wirelessly transmits the vehicle information of the vehicle 60 by broadcasting. The vehicle information of the vehicle 60 includes sensor information detected by the vehicle sensor device 12, a predetermined number of position information continuously received by the GPS receiver 11, and positioning accuracy information.

The warning device 30 includes a speaker and outputs a warning by sound or speech in response to a warning output command from the travel route prediction device 20. The display device 40, which may also be referred to as a display 40, includes a display and/or an indicator, and displays or blinks a warning in response to a warning output command from the travel route prediction device 20. The travel route prediction device 20 outputs a warning output command to the warning device 30 and the display device 40 when a collision between the vehicle 60 and a peripheral vehicle is predicted. Note that only one of the warning device 30 and the display device 40 may be mounded on the vehicle 60.

<2. Process>

Figure 2:
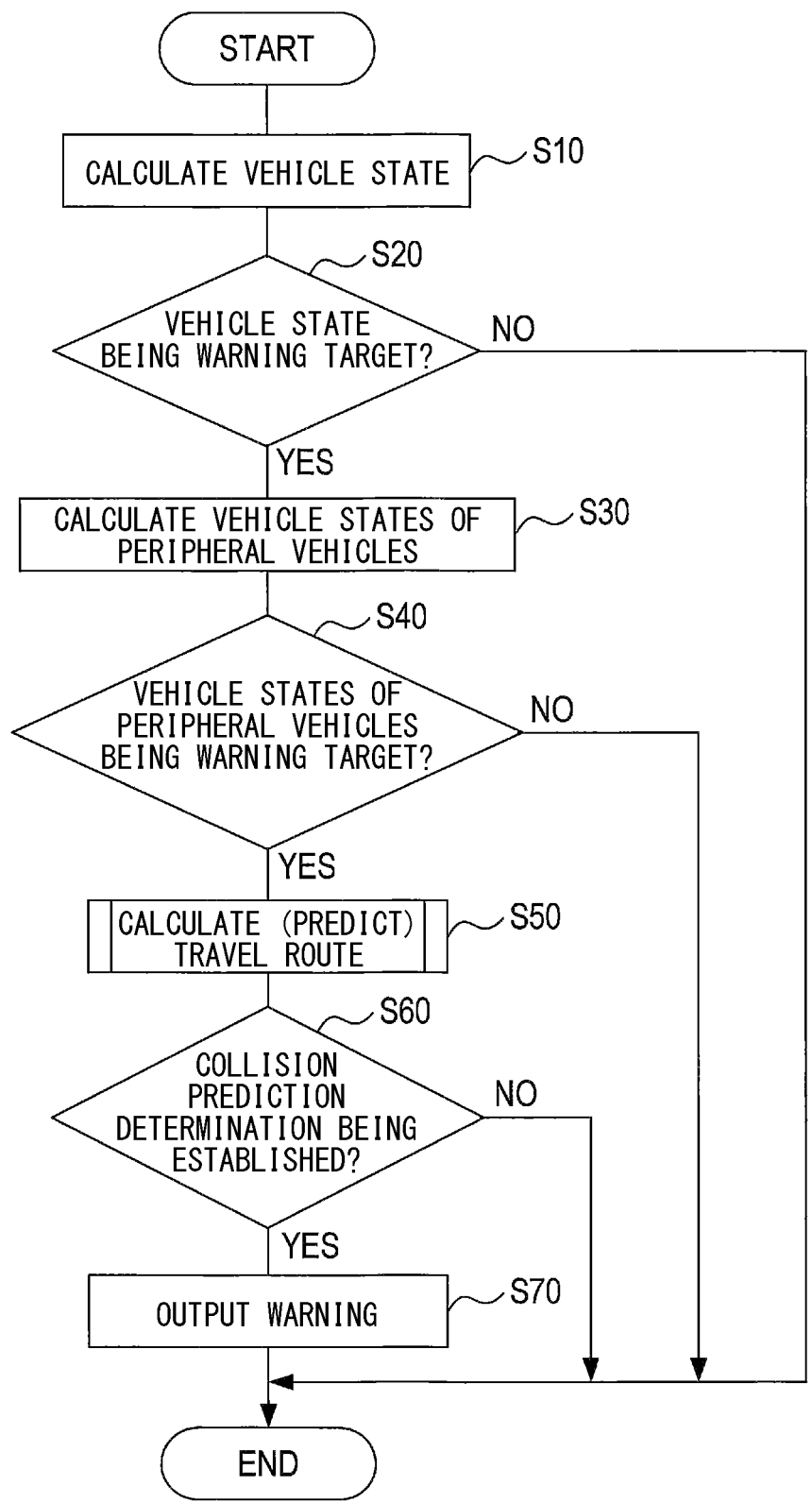
FIG. 2 is a flowchart showing a collision prediction process executed by the travel route prediction device.

Next, the procedure or sequence of the travel route prediction process executed by the travel route prediction device 20 (i.e., the controller included in the travel route prediction device 20 or units included in the controller) will be described with reference to the flowchart of FIG. 2.

First, in S10, the state calculation unit 21 calculates the vehicle state of the vehicle 60 using the GPS signal and the sensor information. Specifically, the state calculation unit 21 calculates the latitude, longitude, and altitude from the GPS signal. Here, the positioning frequency by GPS is relatively low. Therefore, the state calculation unit 21 interpolates the GPS positioning interval using the sensor information and calculates the current position and travel direction of the vehicle 60. That is, the state calculation unit 21 calculates the amount of movement of the vehicle 60 from the time of positioning the latest position by GPS to the present time, and calculates the current position and travel direction of the vehicle 60.

Subsequently, in S20, the state calculation unit 21 determines whether or not the vehicle state of the vehicle 60 calculated in S10 is a warning target (i.e., is subject to the warning). For example, the state calculation unit 21 determines that the vehicle state is not a warning target when the vehicle 60 is stopped, and determines that the vehicle state is the warning target when the vehicle 60 is running. In S20, when it is determined that the vehicle state is a warning target, the processing is shifted to S30. When it is determined that the vehicle state is not a warning target, this process is ended.

In S30, the peripheral state calculation unit 22 calculates the vehicle states of a plurality of peripheral vehicles existing around the vehicle 60. Specifically, the peripheral state calculation unit 22 uses the travel locus information and the sensor information included in the vehicle information received from each of the plurality of peripheral vehicles by vehicle-to-vehicle communication to calculate the current position and travel direction of each peripheral vehicle.

Subsequently, in S40, the peripheral state calculation unit 22 determines whether or not each of the vehicle states of the peripheral vehicles calculated in S30 is a warning target. For example, when the peripheral vehicle is stopped, the peripheral state calculation unit 22 determines that the vehicle state of the peripheral vehicle is not a warning target. When the travel direction of the vehicle 60 and the travel direction of the peripheral vehicle intersect, it is determined that the vehicle state of the peripheral vehicle is a warning target. When it is determined in S40 that the vehicle state of any of the peripheral vehicles is a warning target, the processing is shifted to S50. When it is determined that the vehicle state of any one of the peripheral vehicles is not a warning target, this process is ended.

In S50, the route prediction unit 23 uses the travel locus received from each of the plurality of peripheral vehicles and the positioning accuracy of the position information included in each travel locus to calculate (i.e., predict) the travel route that the vehicle 60 will travel in the future. The details of the prediction of the travel route will be described later.

Subsequently, in S60, the collision prediction determination unit 24 determines whether or not the collision prediction determination between the vehicle 60 and the peripheral vehicles is established by using the travel route calculated in S50. Specifically, a traveled distance between each of the peripheral vehicles and the vehicle 60 is calculated. Then, for example, the collision prediction determination unit 24 determines that the collision prediction determination is established when the calculated traveled distance is less than a determination threshold value. When the traveled distance is equal to or greater than the determination threshold value, it is determined that the collision prediction determination is not established.

The traveled distance is a distance along the shape of the travel path calculated in S50. For instance, suppose a case where a vehicle travels from a first position to a second position. Under such a case, a traveled distance may be defined as a distance actually traveled by the vehicle traveling from the first position to the second position; in contrast, a straight-line distance may be defined as a distance equal to a length of a straight line connecting the first position to the second position.

Figure 7:
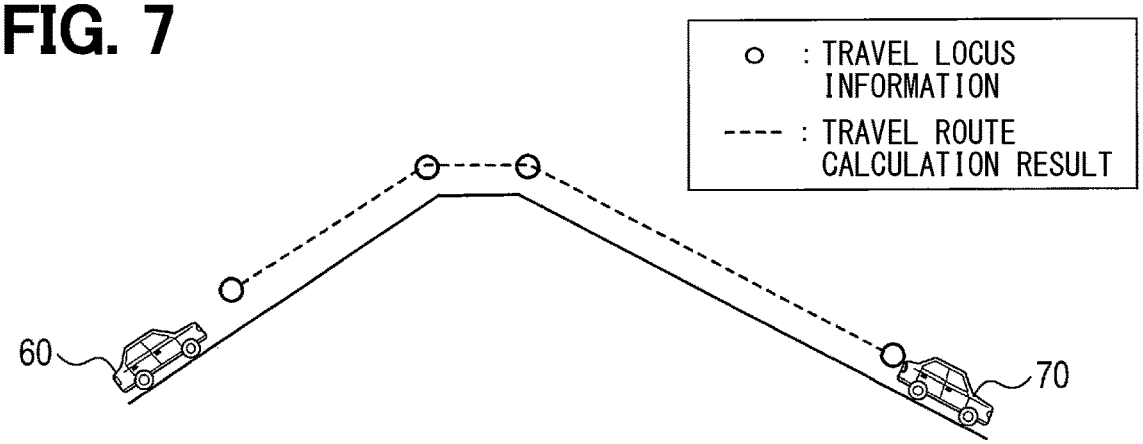
FIG. 7 is an example showing a result of predicting a travel route using altitude.

Here, as shown in FIG. 7, a three-dimensional traveled distance is calculated in consideration of not only latitude and longitude but also altitude. The collision prediction determination is not limited to the comparison between the traveled distance and the determination threshold value. For example, the collision prediction determination unit 24 may determine whether or not a collision occurs based on the traveled distance, the current vehicle speed, and the vehicle acceleration.

Figure 6:
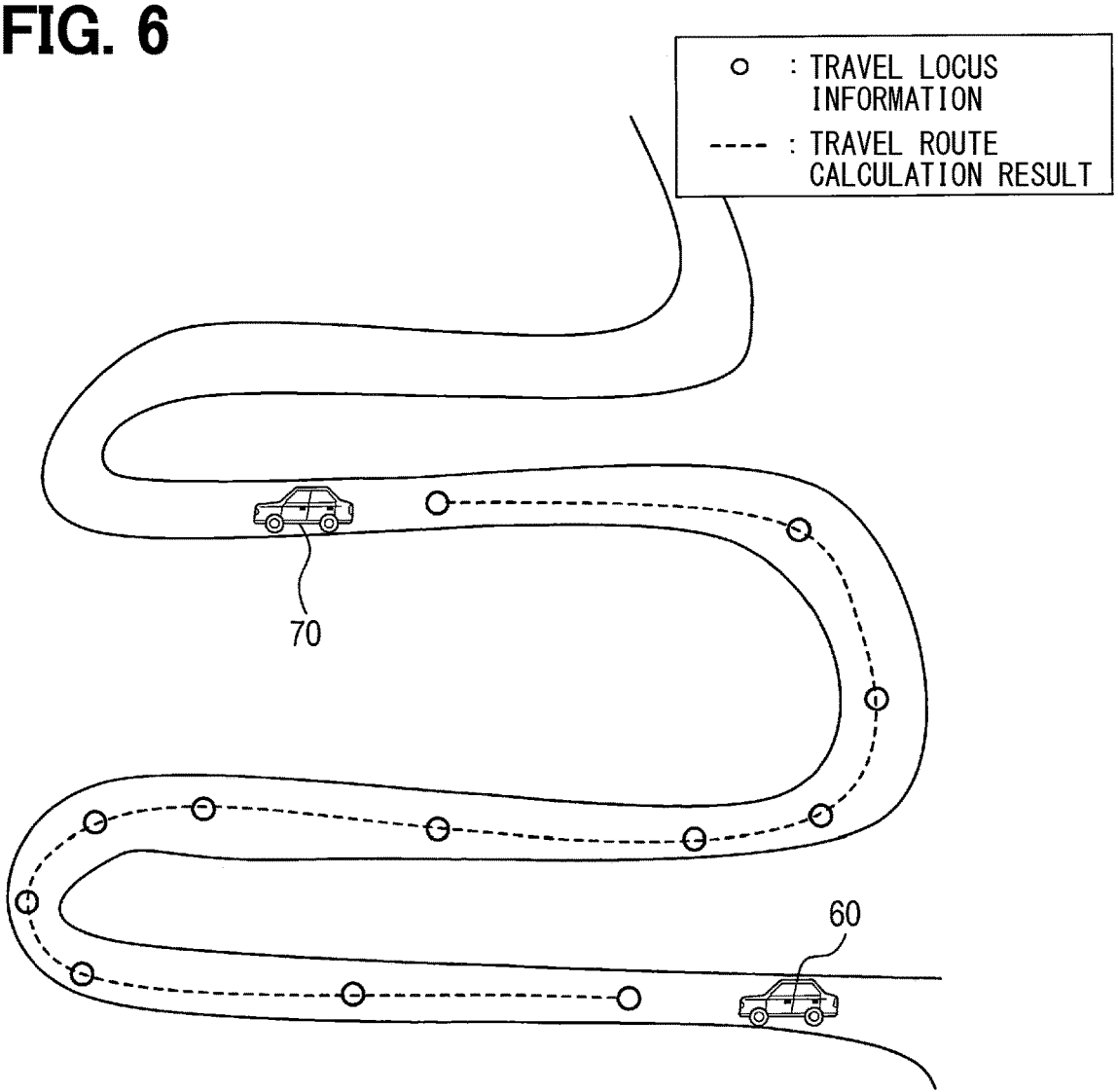
FIG. 6 is an example showing a prediction result of a travel route.

As shown in FIG. 6, when the travel route is bent, the straight-line distance between the vehicle 60 and the peripheral vehicle 70 may be significantly smaller than the traveled distance. Further, as shown in FIG. 7, even when the altitude of the travel route is changed, the straight-line distance between the vehicle 60 and the peripheral vehicle 70 may be smaller than the traveled distance. In such a case, if the straight-line distance is used for the collision prediction determination, the collision prediction determination may be established even when the possibility that the vehicle 60 and the peripheral vehicle 70 actually collide is low. On the other hand, by using the traveled distance for the collision prediction determination, the collision can be predicted according to the shape of the actual travel path.

In S60, when it is determined that the collision prediction determination is established, the processing is shifted to S70. When it is determined that the collision prediction determination is not established, this process is ended.

In S70, the warning output unit 25 outputs a warning output command to the warning device 30 and the display device 40. The process is then ended.

Figure 3:
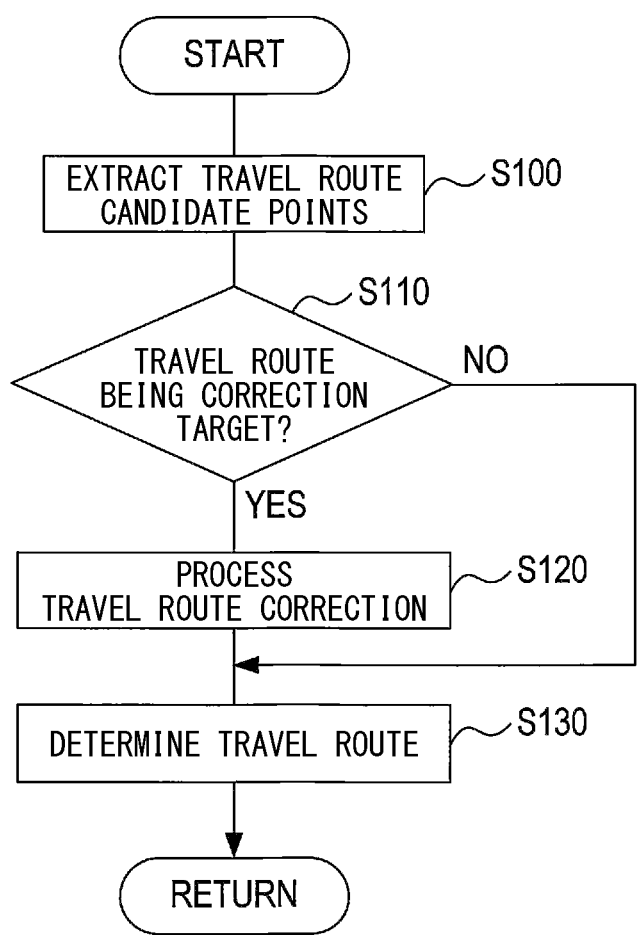
FIG. 3 is a flowchart showing a travel route calculation process executed by the travel route prediction device.

Subsequently, the calculation process of the travel route executed by the route prediction unit 23 included in the controller will be described with reference to the flowchart of FIG. 3.

First, in S100, the route prediction unit 23 extracts candidate points for the travel route. Specifically, a reference locus to be used as a reference is extracted from each travel locus of a plurality of peripheral vehicles, and a point indicated by each position information included in the reference locus is set as a candidate point. The route prediction unit 23 extracts, as a reference locus, a travel locus that satisfies a predetermined condition from the travel loci of peripheral vehicles as the warning targets. Travel locus that satisfies the predetermined condition includes (i) the travel locus of the peripheral vehicle that is closest to the vehicle 60, (ii) the travel locus of the peripheral vehicle traveling in the same direction as the travel direction of the vehicle 60 or in the opposite direction of the vehicle 60, or (iii) the travel locus of the peripheral vehicle being traveling.

Figures 4, 5:
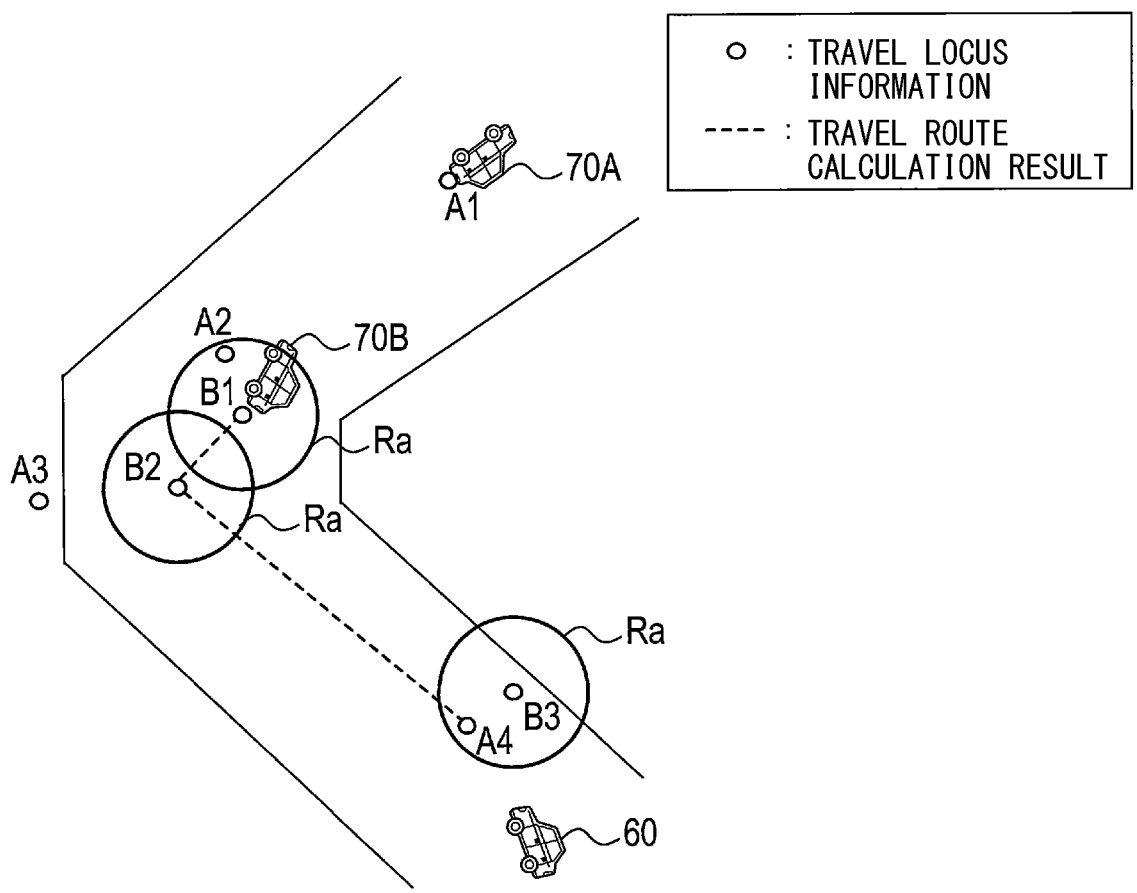
FIG. 4 is a diagram showing travel loci of a plurality of vehicles and a calculation result of a travel route.
FIG. 5 is a diagram showing a positioning accuracy of each of the travel loci in FIG. 4.

FIG. 4 shows travel locus information received by the vehicle 60 from each of the peripheral vehicles 70A and 70B. The travel locus information of the peripheral vehicle 70A includes the points A1, A2, A3, and A4. The travel locus information of the peripheral vehicle 70B includes the points B1, B2, and B3. Here, the travel locus of the peripheral vehicle 70B, which is close to the vehicle 60, is extracted as a reference locus, and the points indicated by B1, B2, and B3 are extracted as candidate points.

Subsequently, in S110, it is determined whether or not there is a correction target of the travel route. When there is a shield that blocks radio waves from GPS satellites around the vehicle 60, the positioning accuracy of the position information of the vehicle 60 by GPS will decrease. When the travel path is calculated using position information with low positioning accuracy, there is a possibility that an incorrect travel route will be calculated. Therefore, when there is a point near the candidate point whose positioning accuracy is higher than that of the candidate point, the candidate point is set as the correction target. Specifically, it is determined whether or not there is a point having a higher positioning accuracy than the candidate point within a predetermined range Ra including the candidate point extracted in S100. The predetermined range Ra may be, for example, a range in which the distance from the candidate point is within a threshold value. In S110, when it is determined that there is a correction target, the processing is shifted to S120. When it is determined that there is no correction target, the processing is shifted to S130.

In S120, the travel route correction process is executed. Specifically, a point having the highest positioning accuracy within the predetermined range Ra is selected as a (updated) candidate point. That is, when there is no point in the predetermined range Ra whose positioning accuracy is higher than that of the candidate point, the candidate point extracted in S100 is used as the candidate point as it is. On the other hand, if there is a point having a higher positioning accuracy than the candidate point extracted in S100, the candidate point is corrected to a point having the higher positioning accuracy.

In the case of the example shown in FIG. 4, the predetermined range Ra including the candidate point B3 includes the point A4. As shown in FIG. 5, the positioning accuracy of the point A4 is higher than the positioning accuracy of the candidate point B3. Therefore, in the predetermined range Ra including the candidate point B3, the candidate point is corrected from the point B3 to the point A4. The predetermined range Ra including the candidate point B2 does not include other points. Therefore, the point B2 is used as the candidate point as it is. The predetermined range Ra including the candidate point B1 includes the point A2. Since the positioning accuracy of the point B1 and the point A2 are the same, the point B1 is used as the candidate point as it is.

In FIG. 5, for convenience of explanation, the positioning accuracy is represented by two values or signs of "good" and "bad", but the positioning accuracy may be represented by a numerical value in a predetermined range.

In S130, the travel route is determined or settled. Specifically, a travel route connecting a plurality of candidate points is determined or settled. In the example shown in FIG. 4, the travel route connecting the point A4, the point B2, and the point B1 is determined or settled. The process is then ended.

<3. Effect>

According to the present embodiment described above, the following effects can be obtained.

(1) Since the travel loci of a plurality of peripheral vehicles and the positioning accuracy of the position information included in each travel locus are used, it is possible to accurately calculate the travel route that the vehicle 60 will travel in the future.

(2) Candidate points included in the reference locus are extracted. Among the points existing in the predetermined range Ra including each of the extracted candidate points, the point having the highest positioning accuracy is selected. Then, each selected point is set as a candidate point, and a travel route is calculated based on a plurality of candidate points. Therefore, the travel locus can be calculated with high accuracy.

(3) Since the travel path is calculated using the position information including the altitude, the three-dimensional travel route can be calculated in consideration of the altitude.

Other Embodiments

Although the embodiment of the present disclosure has been described above, the present disclosure is not limited to the above-described embodiment but various modifications can be made.

(a) In the above embodiment, the reference locus is extracted from the travel locus information of a plurality of peripheral vehicles, but it is not always necessary to extract the reference locus. For example, the area in front of the vehicle 60 may be divided into predetermined ranges Ras, and the point indicated by the position information having the highest positioning accuracy in each predetermined range Ra may be set as a candidate point. In addition, all the position information included in the travel loci of a plurality of peripheral vehicles is grouped together for each position information whose position is close to each other, and the point indicated by the position information with the highest accuracy in each group may be set as a candidate point.

(b) The travel route prediction device 20 (i.e., the controller included in the travel route prediction device 20) and its method described in the present disclosure may be implemented (i) by (a) a first special-purpose computer provided by configuring a processor and a memory programmed to execute one or more functions embodied by a computer program product, or (ii) by (b) a second special-purpose computer provided by configuring a processor with one or more special-purpose hardware logic circuits, or (iii) any combination of (a) the first special-purpose computer provided by configuring the processor and the memory and (b) the second special-purpose computer provided by configuring the processor with one or more special-purpose hardware logic circuits. Further, the computer program may be stored in a computer-readable non-transitory tangible storage medium as instructions to be executed by a computer. The technique for realizing the functions of the respective units included in the travel route prediction device 20 or the controller in the travel route prediction device 20 does not necessarily need to include software, and all of the functions may be realized with the use of one or multiple hardware or circuitry.

(c) A plurality of functions of one constituent element in the above embodiment may be implemented by a plurality of constituent elements, or one function of one constituent element may be implemented by a plurality of constituent elements. Further, multiple functions of multiple constituent elements may be implemented by one constituent element, or one function implemented by multiple constituent elements may be implemented by one constituent element. In addition, a part of the configuration of the above embodiment may be omitted. Further, at least part of the configuration of the above-described embodiment may be added to or replaced with the configuration of another embodiment described above.

(d) In addition to the travel route prediction device 20 described above, the present disclosure can also be realized in various forms such as a system having the travel route prediction device as a constituent element, a program for operating a computer as the travel route prediction device, a non-transitory tangible storage medium such as a semiconductor memory in which this program is stored, a travel route prediction method, and the like.

For reference to further explain features of the present disclosure, the description is added as follows.

A collision accident prevention system registers the time-series vehicle position information received from peripheral vehicles around a host vehicle, estimates the road alignment (i.e., road shape) in front of the host vehicle from a travel locus, which is the registered time-series vehicle position information, and uses the estimated road alignment.

The result of detailed examination by the inventor indicates an issue that if there is a shield around the vehicle that blocks radio waves from satellites such as skyscrapers or forests, the vehicle position information received from the peripheral vehicles becomes inaccurate, and there is a possibility to estimate incorrect road alignment based on inaccurate vehicle position information.

It is thus desired to provide a travel route prediction device capable of accurately predicting a travel route.

An aspect of the present disclosure described herein is set forth in the following clauses.

According to an aspect of the present disclosure, a travel route prediction device is provided to include a receiver and a prediction unit. The receiver is configured to receive travel loci of a plurality of peripheral vehicles around a vehicle and positioning accuracy of each of the travel loci by vehicle-to-vehicle communication. The prediction unit is configured to predict a travel route on which the vehicle will travel in future by using the travel loci and the positioning accuracy received by the receiver.

According to the aspect of the present disclosure, the travel loci of a plurality of other vehicles and the positioning accuracy of each travel locus are used, the travel route can be predicted with high accuracy.

What is claimed is:

1. A travel route prediction device comprising:
    a receiver configured to receive travel loci of a plurality of peripheral vehicles around a vehicle and positioning accuracy of each of the travel loci by vehicle-to-vehicle communication,
        the travel locus including position information included in a GPS signal,
        the positioning accuracy is based on the position information included in the GPS signal; and
    a prediction unit configured to predict a travel route on which the vehicle will travel in future by using the travel loci and the positioning accuracy received by the receiver, wherein
    the prediction unit is further configured to
        extract a reference locus to be used as a reference from the travel loci received by the receiver,
        select a point included in the travel locus having a highest positioning accuracy from among the travel loci existing within a predetermined range including the extracted reference locus, and
        predict the travel route based on the point included in the selected travel locus having the highest positioning accuracy.

2. The travel route prediction device according to claim 1, wherein:
    the prediction unit is further configured to
        select the point included in the travel locus with the highest positioning accuracy among the travel loci existing within a predetermined range of the travel loci received by the receiver, and
        predict the travel route based on the point included in the selected travel locus.

3. The travel route prediction device according to claim 1, wherein:
    the travel locus includes altitude information; and
    the prediction unit is configured to predict the travel route by using the altitude information included in the travel locus.

4. A travel route prediction device comprising:
    a receiver configured to receive travel loci of a plurality of peripheral vehicles around a vehicle and a positioning accuracy of each travel locus by vehicle-to-vehicle communication; and
    a controller communicably coupled to the receiver, the controller being configured to predict a travel route on which the vehicle will travel in future by using the travel loci and the positioning accuracy received by the receiver, wherein
    the controller is further configured to
        extract a reference locus to be used as a reference from the travel loci received by the receiver,
        select a point included in the travel locus having a highest positioning accuracy from among the travel loci existing within a predetermined range including the extracted reference locus, and
        predict the travel route based on the point included in the selected travel locus having the highest positioning accuracy.

5. The travel route prediction device according to claim 4, wherein:
    the travel locus includes position information included in a GPS signal; and
    the positioning accuracy is based on the position information included in the GPS signal.

6. The travel route prediction device according to claim 4, wherein:
    the controller is further configured to
        select the point included in the travel locus with the highest positioning accuracy among the travel loci existing within a predetermined range of the travel loci received by the receiver, and
        predict the travel route based on the point included in the selected travel locus.

* * * * *